United States Patent
Rusev et al.

(10) Patent No.: US 10,970,060 B2
(45) Date of Patent: Apr. 6, 2021

(54) IOT ENDPOINT METRICS

(71) Applicant: VMware, Inc., Palo Alto, CA (US)

(72) Inventors: Sabo Rusev, Sofia (BG); Ivo Petkov, Sofia (BG); Ilya Mayorski, Sofia (BG); Militsa Borisova, Sofia (BG); Ivan Ivanov, Sofia (BG)

(73) Assignee: VMware, Inc., Palo Alto, CA (US)

(*) Notice: Subject to any disclaimer, the term of this patent is extended or adjusted under 35 U.S.C. 154(b) by 85 days.

(21) Appl. No.: 16/511,762

(22) Filed: Jul. 15, 2019

(65) Prior Publication Data
US 2021/0019134 A1    Jan. 21, 2021

(51) Int. Cl.
| | |
|---|---|
| G06F 8/65 | (2018.01) |
| H04L 29/08 | (2006.01) |
| H04L 12/24 | (2006.01) |
| H04L 12/26 | (2006.01) |
| G06F 11/30 | (2006.01) |
| G06F 11/34 | (2006.01) |

(52) U.S. Cl.
CPC .............. *G06F 8/65* (2013.01); *G06F 11/302* (2013.01); *G06F 11/3006* (2013.01); *G06F 11/3495* (2013.01); *H04L 41/082* (2013.01); *H04L 43/04* (2013.01); *H04L 67/125* (2013.01)

(58) Field of Classification Search
CPC ...... G06F 8/65; G06F 11/3006; G06F 11/302; G06F 11/3495; H04L 41/082; H04L 43/04; H04L 67/125
USPC .................................................. 717/168–178
See application file for complete search history.

(56) References Cited

U.S. PATENT DOCUMENTS

2019/0306023 A1* 10/2019 Vasseur .................. H04L 41/16
2020/0252310 A1*  8/2020 Thampy ................ H04L 41/142

* cited by examiner

*Primary Examiner* — Chuck O Kendall
(74) *Attorney, Agent, or Firm* — Thomas | Horstemeyer LLP

(57) ABSTRACT

Disclosed are various embodiments for collecting and presenting IoT metrics. A software update package can be deployed to an IoT gateway. A device template used to register an IoT endpoint with an IoT management service can also define metrics that can be collected regarding the performance of the IoT endpoints.

20 Claims, 4 Drawing Sheets

IOT ENDPOINT METRICS

BACKGROUND

As the costs for electronic components have decreased, network and computational capabilities have been added to a wide range of devices that were typically operated independently. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. The ever expanding number of devices which incorporate network connectivity and computational ability is often referred to as the "Internet of Things."

However, the scale of the Internet of Things presents a number of management issues. For example, where an enterprise can have had a few hundred computers that could be manually updated by an information technology (IT) department, the number of devices in the Internet of Things can result in tens of thousands of network connected devices being deployed in an enterprise environment. Management of these devices, such as requirements to deploy software updates and track metrics related to the performance of the updates and the devices at scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for collecting metrics relating to the performance the operation of network connected devices, such as Internet of Things (IoT) devices, or IoT endpoints. The metrics can also relate to the rollout of software update packages to IoT endpoints. As diverse IoT endpoints are deployed and operational in the field, an administrator may lack information about the performance the operation of the IoT endpoints that are enrolled with an IoT gateway. Additionally, as new versions of application or device firmware become available for IoT endpoints, an administrator might be tasked with updating a large number of IoT devices with updated firmware and applications. In this scenario, after installing a software update, an administrator might wish to visualize a comparison of the performance and operation of the IoT endpoints before and after installation of new software.

To facilitate the collection of metrics, an IoT endpoint or IoT gateway can be registered with an IoT management service using a device template. The device template can specify one or more metrics that are collected from the device. A software agent running on an IoT endpoint or IoT gateway can collect the specified metrics and provide them to a management service, which can track historical metric data. The management service can provide a management console through which an administrative user can view the metrics. The management console can allow the user to view a comparison of metrics that are collected before a software update and also after a software update.

The collected metrics can be time-based metrics, such as a memory usage per unit of time, a CPU usage per unit of time, or a disk usage per unit of time. The metrics, when visualized through a management user interface, can provide an indication of the performance of an IoT endpoint or IoT gateway over time.

Figure 1:
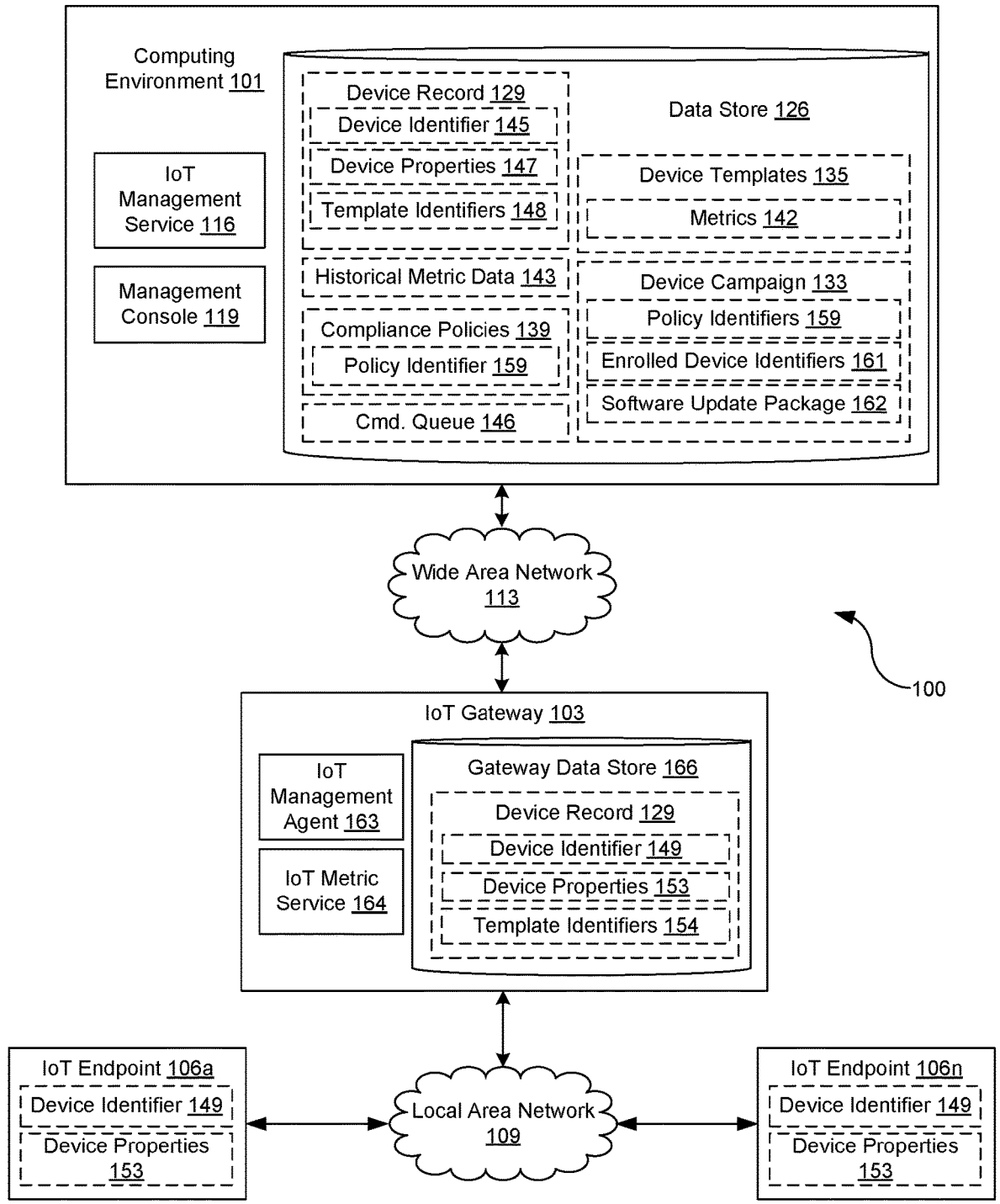
FIG. 1 is a drawing illustrating an example arrangement of a network environment according to various embodiments of the present disclosure.

As illustrated in FIG. 1, shown is a networked environment 100 according to various embodiments. The networked environment 100 includes a computing environment 101, an internet of things (IoT) gateway 103, and a number of IoT endpoints 106a-n. The computing environment 101, the IoT gateway 103, and the IoT endpoints 106a-n can be in data communication with each other. For example, multiple IoT endpoints 106a-n can be in data communication with each other or with an IoT gateway 103 over a local area network (LAN) 109. The IoT gateway 103 can in turn be in data communication with the computing environment 101 over a wide area network (WAN) 113.

The LAN 109 represents a computer network that interconnects computers within a limited area or a limited logical grouping. For example, the LAN 109 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), or other limited area or limited grouping of devices.

The WAN 113 represents a computer network that interconnects computers that are members of separate LANS 109. Accordingly, the WAN 113 can correspond to a network of networks, such as the Internet.

The LAN 109 and the WAN 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 109 or the WAN 113 can also include a combination of two or more networks.

The computing environment 101 can include, for example, a server computer or any other system providing computing capability. Alternatively, the computing environment 101 can employ a plurality of computing devices that can be arranged, for example, in one or more server banks, computer banks, or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101 according to various embodiments. The components executed on the computing environment 101, for example, can include an IoT management service 116, a management console 119, and other applications, services, processes, systems, engines, or functionality not discussed in detail herein.

Also, various data is stored in a data store 126 that is accessible to the computing environment 101. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more device records 129, one or more device campaigns 133, one or more device templates 135, one or more compliance policies 139, one or more command queues 146, and potentially other data.

The IoT management service 116 can oversee the operation of IoT gateways 103 and IoT endpoints 106 enrolled with the IoT management service 116. The IoT management service 116 can further cause device records 129 to be created, modified, or deleted (such as in response to enrollment or unenrollment or registration of an IoT endpoint 106). Commands issued by the IoT management service 116 for IoT endpoints 106 or IoT gateways 103, such as to apply settings or perform actions specified by compliance policies 139, can be stored in the command queue 146 by the IoT management service 116. As discussed later, the IoT gateway 103 can retrieve and execute any commands stored in the command queue 146.

The management console 119 can provide an administrative interface for configuring the operation of individual components in the networked environment 100. For example, the management console 119 can provide an administrative interface for the IoT management service 116. The management console 119 can also provide an interface for the configuration of device campaigns 133 containing software update packages that are applicable to IoT endpoints 106. The management console 119 can also provide a user interface for visualizing metrics collected from IoT endpoints 106, including comparisons of metrics collected before and after installation of software updates on the IoT endpoints 106. Accordingly, the management console 119 can correspond to a web page or a web application provided by a web server hosted in the computing environment 101.

A device record 129 can represent an IoT endpoint 106 enrolled with and managed by the IoT management service 116. Accordingly, a device record 129 can be created by the IoT management service 116 in response to enrollment of a respective IoT endpoint 106. Therefore, each device record 129 can include a device identifier 145, one or more device properties 147, and potentially other data associated with an enrolled IoT endpoint 106.

A device identifier 145 can represent data that uniquely identifies an IoT endpoint 106 with respect to another IoT endpoint 106 and, therefore, allow one to uniquely identify one device record 129 with respect to another device record 129. Examples of device identifiers 145 include media access control (MAC) addresses of network interfaces of individual IoT endpoints 106, globally unique identifiers (GUIDs) or universally unique identifiers (UUIDs) assigned to enrolled IoT endpoints 106, international mobile equipment identifier (IMEI) numbers assigned to cellular modems of IoT endpoints 106, and tuples that uniquely identify an IoT endpoint 106 (such as a combination of a manufacturer name and serial number). However, other information can also be used as a device identifier 145 in various implementations.

A device property 147 can represent information related to or regarding an IoT endpoint 106. In some instances, a device property 147 can reflect the status of an IoT endpoint 106 or a component of an IoT endpoint 106. Examples of device properties 147 can include information about the IoT endpoint 106 itself, such as the manufacturer, model name and model number, model revision of the IoT endpoint 106. Similarly, device properties 147 can include information such as identifiers of software packages installed on the IoT endpoint 106, version information for software packages installed on the IoT endpoint 106, and potentially other information. A template identifier 148 can identify a device template 135 with which a particular device belongs. The IoT endpoint 106 can be configured according to the device properties 147 and metrics 142 that are specified by the device template 135. By being configured with the metrics 142, an IoT endpoint 106 can report the metrics associated with the device template 135 with which they are registered so that the metrics 142 can in turn be shown to an administrator.

A device template 135 can represent a template or blueprint for how IoT endpoints 106 should be registered or enrolled with the IoT management service 116 or the IoT gateway 103. The device template 135 can specify certain device properties 147 that should be configured for a particular IoT endpoint 106 when the endpoint is registered with the IoT management service 116.

The device template 135 can also specify one or more metrics 142 that should be collected from an IoT endpoint 106 when the endpoint is registered with the IoT management service 116. The metrics 142 can represent performance data regarding an IoT endpoint 106 that should be collected over a particular time interval or once a certain sample size has been reached. For example, the metrics 142 can represent CPU usage, memory usage, or disk usage. The metrics 142 can also include a custom performance variable that can be specified and collected from the IoT endpoint 106, such as temperature data, power usage, battery levels, or other custom data that the IoT endpoint 106 can be equipped to collect.

When an IoT endpoint 106 or is registered with the IoT management service 116 via the IoT gateway 103, the device template 135 can instruct the IoT gateway 103 to cause the metrics 142 specified in the device template 135 to be collected from the IoT endpoint 106. In this way, the IoT gateway 103 can collect metrics 142 that are reported back to the IoT management service 116 for analysis by an administrator. The metrics 142 can also be visualized along with milestones, such as installation of a software update onto a number of IoT endpoints 106 associated with a device campaign 133.

Historical metric data 143 represents an archive of metrics that have been collected from enrolled IoT endpoint 106. The historical metric data 143 can represent one or more tables within the data store 126 or a separate database or data store in which the data can be warehoused. The historical metric data 143 can allow the management console 119 to present visualizations of metrics 142 that are stored as historical metric data 143. As metrics 142 are collected from IoT endpoints 106, the data corresponding to the metrics 142 can be stored as historical metric data 143. The historical metric data 143 can be categorized by device template 135 or other category such as device type or metric type.

A device campaign 133 can represent a set or collection of compliance policies 139 that have been assigned to one or more IoT endpoints 106. When an IoT endpoint 106 is assigned to a device campaign 133, the IoT management service 116 can cause any compliance policies 139 identified by or associated with the device campaign 133 to be enforced on the IoT endpoint 106, as later described. Accordingly, the device campaign 133 can include one or more policy identifiers 159 that identify individual compliance policies 139 assigned to or associated with the device campaign 133, and a list of enrolled device identifiers 161 that includes device identifiers 145 identifying device records 129 for IoT endpoints 106 subject to the device campaign 133. Other information can also be stored in a device campaign 133 as desired for individual implementations. In some implementations, the device campaign 133 can also include a software update package identifier that identifies the software update package 162 associated with the campaign.

A device campaign 133 can also be associated with one or more software update packages 162. A software update package 162 can be created with a package tool and bundles a software executable for installation on an IoT endpoint 106, a manifest file that specifies what is contained within the software update package 162, and one or more lifecycle scripts. The device campaign 133 can also specify a device template 135 that is associated with the campaign so that, for example, software update packages 162 can be distributed to the devices associated with a particular template.

A compliance policy 139 represents a definition of a state in which an IoT endpoint 106 is required to be. For example, a compliance policy 139 can specify that an IoT endpoint 106 have a particular version or a minimum version of a software update package 162 installed. If the IoT endpoint 106 fails to have the version of the software update package 162 installed, then the IoT endpoint 106 can be considered to be non-compliant. Other examples of compliance policies 139 can include a requirement that a particular setting for an IoT endpoint 106 be enabled or disabled, a requirement that the IoT endpoint 106 be configured in a particular manner, or other requirements appropriate for particular implementations. A compliance policy 139 can also include a policy identifier 159 that uniquely identifies a compliance policy 139 with respect to other compliance policies 139. Examples of policy identifiers 159 can include an incremented integer or similar value, a GUID, a UUID, or similar unique identifier.

In some implementations, a compliance policy 139 can also specify a remedial action if the IoT endpoint 106 is determined at a later point in time to not be in a state consistent with the state specified by the compliance policy 139. For example, if the compliance policy 139 specifies that a particular version of a software update package 162 be installed on an IoT endpoint 106, the compliance policy 139 may also specify that if that version of the software update package 162 is not installed on the IoT endpoint 106, then the software update package 162 should be installed or reinstalled. Such remedial actions allow for non-compliant or formerly compliant IoT endpoints 106 to be brought into compliance.

A command queue 146 can represent a queue of commands sent from an IoT management service 116 to an IoT management agent 163. When the IoT management service 116 sends a command or instruction, such as a command to apply a software update specified in a device campaign 133 to an IoT endpoint 106, the command can be stored in the command queue 146 until the IoT management agent 163 retrieves the command from the command queue 146. In some instances, a dedicated command queue 146 can be created for each instance of an IoT management agent 163. In other instances, however, a single command queue 146 can be used to store commands intended for multiple IoT management agents 163. An IoT endpoint 106, device campaign 133, or IoT gateway 103 can be associated with their own respective command queues 146.

In one example, the command queue 146 can include commands for an IoT endpoint 106 to report metrics back to the IoT gateway 103. The commands can specify a frequency of reporting the metrics to the IoT gateway 103. The commands can also specify what type of metrics 142 that should be collected from the IoT endpoint 106.

The IoT gateway 103 represents a computing device that acts as a proxy or relay between IoT endpoints 106*a*-*n* and the IoT Management service 116. For example, an IoT gateway 103 can represent a network access point or interface between the local area network 109 and the wide area network 113. In other instances, the IoT gateway 103 can be a dedicated device attached to the LAN 109 that communicates across the WAN 113 with the IoT management service 116 on behalf of IoT endpoints 106 attached to the LAN 109.

An IoT management agent 163 can be executed by the IoT gateway 103 to perform various functions on behalf of the IoT endpoints 106*a*-*n*. For example, the IoT management agent 163 can register or enroll IoT endpoints 106*a*-*n* with the IoT management service 116. As another example, the IoT management agent 163 can download, process, and enforce one or more applicable compliance policies 139. For instance, the IoT management agent 163 can retrieve a command from the command queue 146. The command can instruct the IoT management agent 163 to collect certain metrics 142 from IoT endpoints 106 using the IoT metric service 164. Accordingly, the IoT management agent 163 could then relay the respective metrics 142 to the IoT management service 116. The IoT management agent 163 can also enroll IoT endpoints 106 with the IoT management service 116 according to a specified device template 135, which also specifies the metrics 142 to be collected from the IoT endpoints 106.

The IoT metric service 164 can act as a server process that can collect metrics 142 from various IoT endpoints 106 that are deployed and that are managed using the IoT gateway 103. The IoT metric service 164 can also report collected metrics 142 from the IoT endpoints 106 to the IoT management service 116 for storage as historical metric data 143. The metrics 142 can be obtained periodically or in real time. In some implementations, the metrics 142 can be collected according to a granularity of the metric 142 itself. For example, if the metric 142 specifies collection of CPU usage per second, the metrics 142 can be collected by the IoT metric service 164 every second or based on a multiple of a second. As another example, IoT metric service 164 can be collected when a minimum sample size of collected metrics 142 has been reached on a particular IoT endpoint 106. The IoT endpoints 106 can report metrics along with a device identifier 149 so that the data can be associated with the correct device template 135 in the historical metric data 143.

The gateway data store 166 can be representative of a plurality of gateway data stores 166, which can include relational databases, object-oriented databases, hierarchical databases, hash tables or similar key-value data stores, as well as other data storage applications or data structures. The data stored in the gateway data store 166 is associated with the operation of the various applications or functional entities described below. This data can include one or more device records 129 of respective IoT endpoints 106a-n obtained from the IoT management service 116. In some implementations, the IoT gateway 103 can obtain device templates 135 or data regarding metrics 142 that should be collected from the IoT endpoints 106 on behalf of the IoT management service 116.

An IoT endpoint 106 is representative of any internet connected embedded device, appliance, sensor, or similar smart device. Examples of IoT endpoints 106 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 106 are often distinguishable from other client devices (such as personal computers or mobile devices) by their lack of functionality. For example, IoT endpoints 106 often do not provide general purpose computing abilities, lack an operating system that allows for a remote management service to gain direct administrative control over the IoT endpoint 106, and/or IoT endpoints 106 are not configured or configurable to execute an IoT management agent 163.

Often, an IoT endpoint 106 can also store a device identifier 145 that uniquely identifies the IoT endpoint 106 and one or more device properties 147. In some instances, one or more of these values can be set by the manufacturer. In other instances, one or more of these values can be set or specified by the IoT management service 116. An IoT endpoint 106 can run a particular operating system or shell environment that permits the execution of lifecycle scripts that correspond to the different lifecycle phases. The IoT endpoint 106 can also include a filesystem in which metrics 142 collected for reporting to the IoT metric service 164 can be stored.

Next, a general description of the operation of the various components of the networked environment 100 is provided. However, more detailed descriptions of the operation of individual components of the networked environment 100 is set forth in the discussion of the subsequent figures. To begin, an administrative user can generate a device template 135 that can specify one or more metrics 142 for collection from IoT endpoints 106. The device template 135 can also specify other device properties 147 that should be applied to a particular IoT endpoints 106 that is associated with the device template 135.

The user can register a new IoT endpoint 106 or IoT gateway 103 with the IoT management service 116. As a part of the registration process, the user can select or define a device template 135 that identifies one or more device properties 147 that should be used to configure the device. Additionally, the device template 135 can specify one or more metrics 142 for collection from the IoT endpoint 106. When the device is registered to the IoT management service 116, the metrics 142 to be collected can be provided to the IoT endpoint 106, which can collect and report the metrics 142 to the IoT metric service 164. The IoT metric service 164 can in turn report the collected metrics 142 to the IoT management service 116.

The IoT management service 116 can store the collected metrics 142 as historical metric data 143. The management console 119 can then provide visualization options to an administrative user, which can include a comparison of the performance of IoT endpoints 106 before and after the installation of a software update to the IoT endpoints 106 associated with a particular device template 135.

Figure 2:
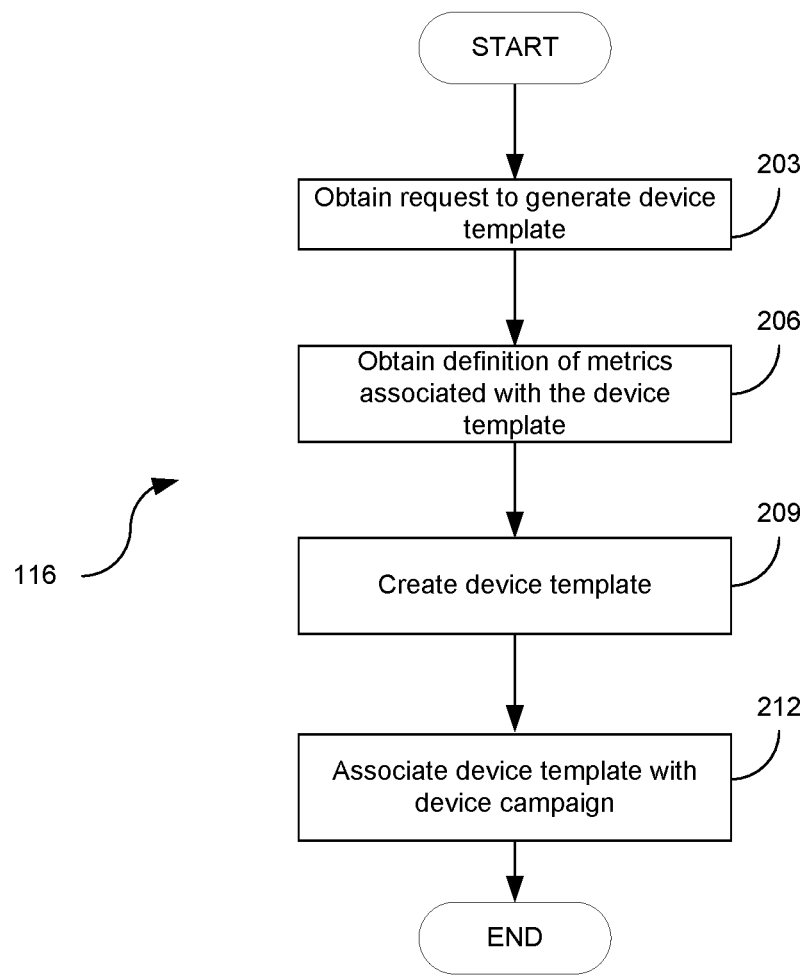
FIG. 2 is a flowchart depicting an example of the operation of components of the network environment of FIG. 1.

Referring next to FIG. 2, shown is a flowchart that provides one example of the operation of the IoT management service 116. FIG. 2 provides merely an example of the many different types of functional arrangements that can be employed to implement the operation of the IoT management service 116. As an alternative, the flowchart of FIG. 2 can be viewed as depicting an example of elements of a method implemented in the computing environment 101. FIG. 2 illustrates how the IoT management service 116 can associate a device template 135 with IoT endpoints 106.

Beginning at step 203, the IoT management service 116 can obtain a request to generate a device template 145. The request can be obtained through an administrative user interface, such as the management console 119. The user interface can allow the user to specify a name for the device template 145 as well as any device properties 147 that apply to the template. Additionally, the user can identify one or more metrics 142 that should be associated with the device template 145. The user can select from predetermined metrics 142, such as CPU usage, memory usage, or disk usage. The user can also define a custom metric 142 that should be associated with the device template 145. When an administrator associates a device template 145 with an IoT endpoint 106, the device template 145 specifies not just the metrics 142 but also the device properties 147. Additionally, the device template 145 can identify a device campaign 133 that should be associated with the IoT endpoints 106. The administrator can change or modify any of the device campaign 133 or the device properties 147 when specifying or defining the device template 145.

At step 206, the IoT management service 116 can obtain the definition of metrics 142 from an administrator defining the device template 145. The definition of the metrics 142 can include the type of metric 142. The metric 142 can specify the type of data to be collected and a time period over which the data should be collected. The definition can also include a frequency with which IoT endpoint 106 should report collected metrics 142 back to the IoT metric service 164. In some implementations, the IoT metric service 164 can report metrics 142 back to the IoT management service 116 in real time or in batches.

At step 209, the IoT management service 116 can create the device template 145 that was created in steps 203 and 206. The device template 145 can be assigned to IoT endpoints 106 that are registered with the IoT management service 116 so that the performance of the IoT endpoints 106 can be visualized using the management console 119.

At step 212, the IoT management service 116 can associate the device template 145 with one or more device campaigns 133. By associating the device template 145 with a device campaign 133, the IoT endpoints 106 within the device campaign 133 can collect and report the metrics 142 specified within the device template 145. Thereafter, the process shown in FIG. 2 ends.

Figure 3:
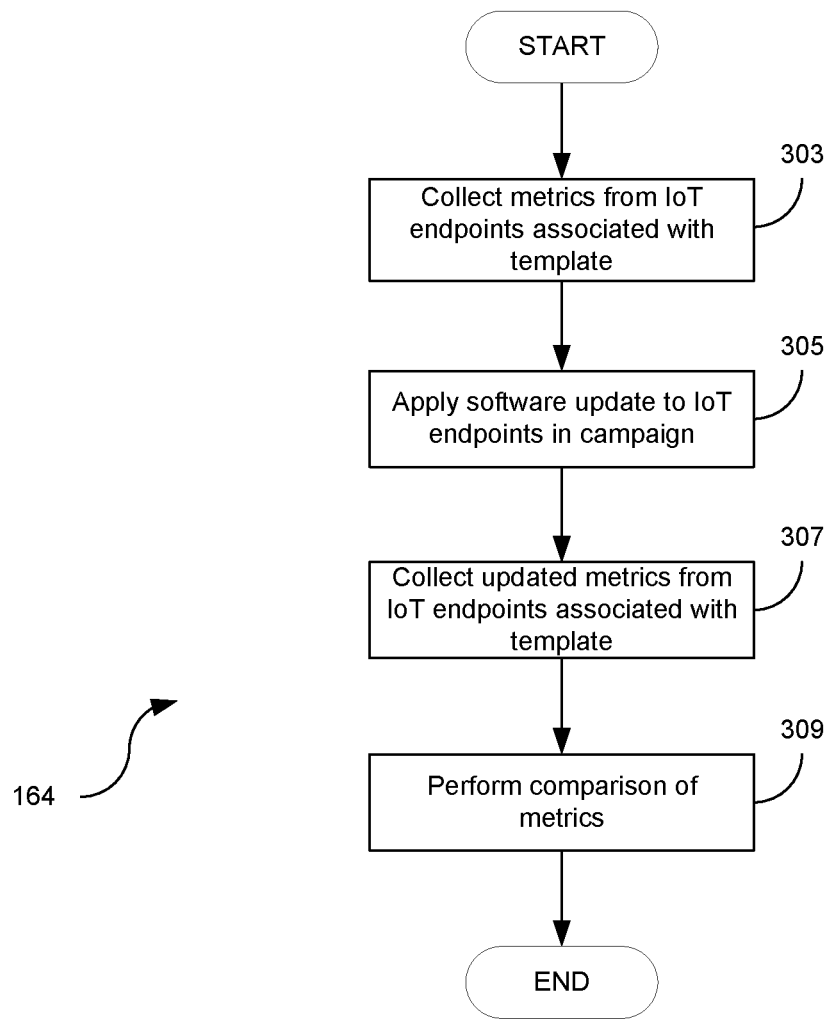
FIG. 3 is a flowchart depicting an example of the operation of components of the network environment of FIG. 1.

Referring next to FIG. 3, shown is a flowchart that provides one example of the operation of the IoT management service 116. FIG. 3 provides merely an example of the many different types of functional arrangements that can be employed to implement the operation of the IoT management service 116. As an alternative, the flowchart of FIG. 3 can be viewed as depicting an example of elements of a method implemented in the computing environment 101. FIG. 3 illustrates how the IoT management service 116 can perform a comparison of metrics that are collected from IoT endpoints 106 before and after the installation of a software update on a selection of IoT endpoints 106.

As noted above, an administrator might wish to perform a comparison of metrics 142 that are specified by a device template 145 and that are collected from a population of IoT endpoints 106 that are enrolled with the IoT management service 116. The IoT endpoints 106 are also associated with a device template 145 that specifies the metrics 142 that should be collected from the IoT endpoints 106. A comparison of metrics from before and after installation of a software update can give an indication to the administrator of whether there are issues or problems that are caused by the software update.

First, at step 303, the IoT metric service 164 can collect metrics from IoT endpoints 106. The metrics 142 can represent performance data regarding an IoT endpoint 106 that should be collected over a particular time interval or once a certain sample size has been reached. For example, the metrics 142 can represent CPU usage, memory usage, or disk usage. The metrics 142 can also include a custom performance variable that can be specified and collected from the IoT endpoint 106, such as temperature data, power usage, battery levels, or other custom data that the IoT endpoint 106 can be equipped to collect.

At step 305, the IoT metric service 164 can apply a software update to the IoT endpoints 106. In some implementations, the software update can be rolled out by another service or process running on the IoT gateway 103 that is tasked with obtaining a software executable and causing the IoT endpoints 106 associated with a particular device campaign 133 to install the software executable.

At step 307, the IoT metric service 164 can collect metrics from the IoT endpoints 106 after installation of the software update. Again, the metrics 142 can represent performance data regarding an IoT endpoint 106 that should be collected over a particular time interval or once a certain sample size has been reached. The metrics 142 can again represent CPU usage, memory usage, or disk usage. By collecting the same metrics 142 from after the software update is installed on the IoT endpoints 106 in a device campaign 133, the IoT metric service 164 can facilitate a comparison of the performance of the IoT endpoints 106 from before and after installation of the software update.

At step 309, the IoT metric service 164 can perform a comparison of the metrics 142 from before and after installation of the software update on the IoT endpoints 106 in a device campaign 133. The comparison can comprise a visualization of trends and history of the performance of the IoT endpoints 106 in the device campaign 133 over time. The comparison can also provide an indication of when the software update was applied to the IoT endpoints 106. Thereafter, the process proceeds to completion.

Figure 4:
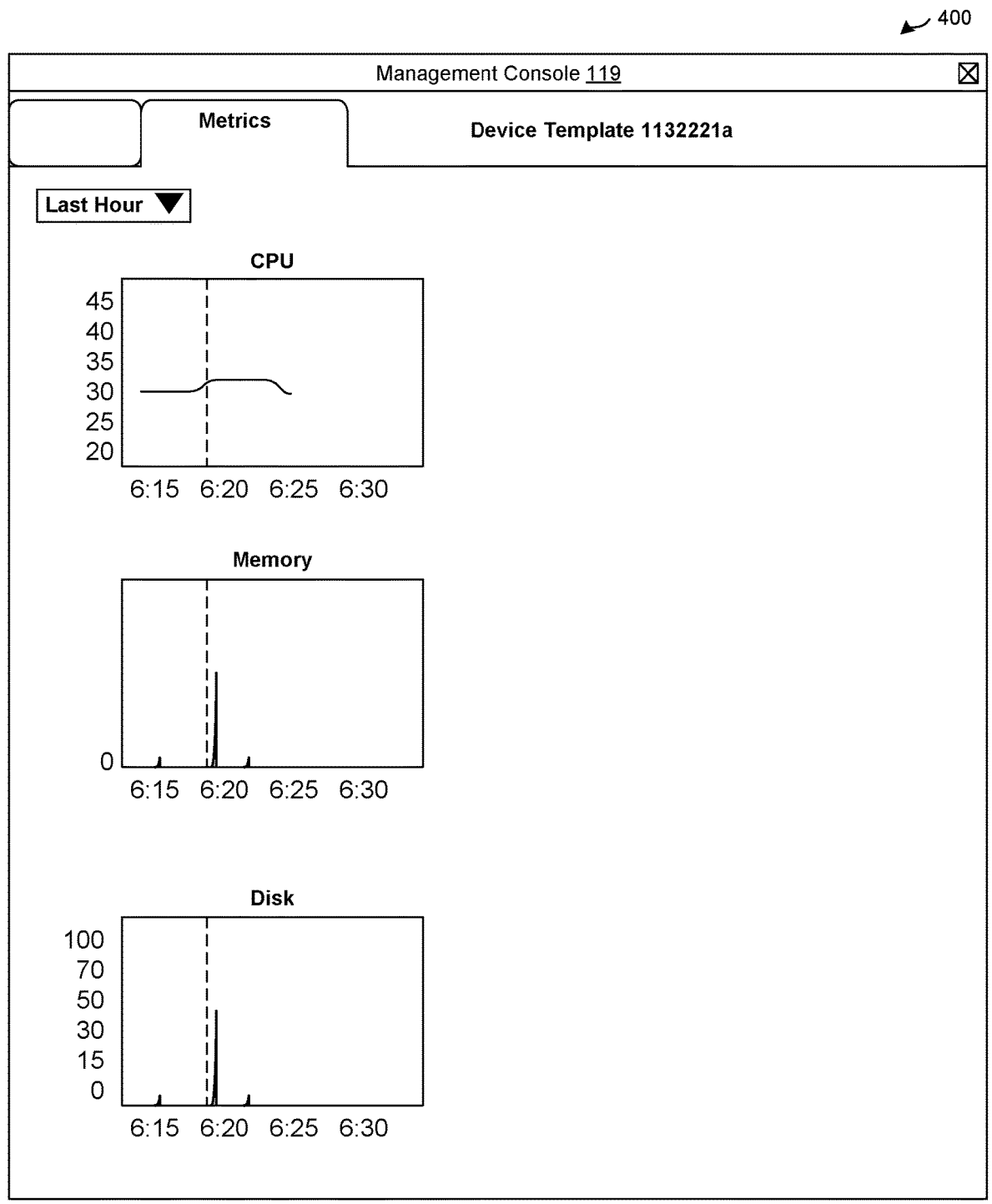
FIG. 4 is a user interface according to an example of the operation of components of the network environment of FIG. 1.

Referring next to FIG. 4, shown is a user interface 400 that can be generated by the management console 119. The user interface 400 can present a comparison or visualization of metrics 142 that are collected from the IoT endpoints 106 by the IoT metric service 164. The management console 119 can generate the user interface 400 by retrieving historical metric data 143 for a particular device template 145 or a device campaign 133.

Once the historical metric data 143 is retrieved, the management console 119 can present the metrics 142 associated with a particular device template 145 in a user interface 400. In one implementation, the user interface 400 can provide a selector so that the user can adjust the amount of historical metric data 143 presented in the user interface 400. For example, the selector can allow the user to view historical metric data 143 for a particular device template 145 over the previous hour. In the depicted user interface 400, CPU usage, memory usage, and disk usage are shown. However, other metrics 142 can also be presented within the user interface 400, such a custom defined metrics 142 that are associated with the device template 145.

The user interface 400 can present a comparison of metrics 142 from before and after installation of a software update on IoT endpoints 106. In one example, the user interface 400 can present a relative efficiency of the IoT endpoints 106 from a CPU, memory, and disk perspective from before and after installation of the software update on the IoT endpoints 106.

Although the IoT management service 116, the IoT metric service 164, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
    a computing device comprising a processor and a memory;
    machine readable instructions stored in the memory that, when executed by the processor, cause the computing device to at least:
        obtain a definition of a device template specifying at least one device property associated with a plurality of IoT endpoints, the device template specifying at least one metric collected for the plurality of IoT endpoints;
        collect metric data associated with the at least one metric for the plurality of endpoints;
        cause the metric data to be stored in a data store associated with a deployment of the IoT endpoints;
        cause a software update to be installed on the plurality of IoT endpoints;
        collect updated metric data associated with the at least one metric for the plurality of endpoints after the software update;
        cause the updated metric data to be stored in the data store; and
        generate a comparison of the metric data and the update metric data.

2. The system of claim 1, wherein the comparison comprises a relative efficiency of the IoT endpoints from before installation of the software update and after installation of the software update.

3. The system of claim 1, wherein the at least one metric comprises a processor usage, a memory usage, or a disk usage of the IoT endpoints.

4. The system of claim 1, wherein the at least one metric is a time-based interval.

5. The system of claim 1, wherein the metric data and the updated metric data are obtained from the IoT endpoints upon a respective sample size reaching a threshold size.

6. The system of claim 1, wherein the metric data and the updated metric data are transmitted to the data store by batch transmission.

7. The system of claim 1, wherein the software update is associated with a device campaign linking together IoT endpoints that are enrolled with an IoT gateway.

8. A method, comprising:
    obtaining a definition of a device template specifying at least one device property associated with a plurality of IoT endpoints, the device template specifying at least one metric collected for the plurality of IoT endpoints;
    collecting metric data associated with the at least one metric for the plurality of endpoints;
    causing the metric data to be stored in a data store associated with a deployment of the IoT endpoints;
    causing a software update to be installed on the plurality of IoT endpoints;
    collecting updated metric data associated with the at least one metric for the plurality of endpoints after the software update;
    causing the updated metric data to be stored in the data store; and
    generating a comparison of the metric data and the update metric data.

9. The method of claim 8, wherein the comparison comprises a relative efficiency of the IoT endpoints from before installation of the software update and after installation of the software update.

10. The method of claim 8, wherein the at least one metric comprises a processor usage, a memory usage, or a disk usage of the IoT endpoints.

11. The method of claim 8, wherein the at least one metric is a time-based interval.

12. The method of claim 8, wherein the metric data and the updated metric data are obtained from the IoT endpoints upon a respective sample size reaching a threshold size.

13. The method of claim 8, wherein the metric data and the updated metric data are transmitted to the data store by batch transmission.

14. The method of claim 8, wherein the software update is associated with a device campaign linking together IoT endpoints that are enrolled with an IoT gateway.

15. A non-transitory, computer-readable medium, comprising machine readable instructions that, when executed by a processor, cause a computing device to at least:
    obtain a definition of a device template specifying at least one device property associated with a plurality of IoT endpoints, the device template specifying at least one metric collected for the plurality of IoT endpoints;
    collect metric data associated with the at least one metric for the plurality of endpoints;
    cause the metric data to be stored in a data store associated with a deployment of the IoT endpoints;
    cause a software update to be installed on the plurality of IoT endpoints;
    collect updated metric data associated with the at least one metric for the plurality of endpoints after the software update;
    cause the updated metric data to be stored in the data store; and
    generate a comparison of the metric data and the update metric data.

16. The non-transitory, computer-readable medium of claim 15, wherein the comparison comprises a relative efficiency of the IoT endpoints from before installation of the software update and after installation of the software update.

17. The non-transitory, computer-readable medium of claim 15, wherein the at least one metric comprises a processor usage, a memory usage, or a disk usage of the IoT endpoints.

18. The non-transitory, computer-readable medium of claim 15, wherein the at least one metric is a time-based interval.

19. The non-transitory, computer-readable medium of claim 15, wherein the metric data and the updated metric data are obtained from the IoT endpoints upon a respective sample size reaching a threshold size.

20. The non-transitory, computer-readable medium of claim 15, wherein the metric data and the updated metric data are transmitted to the data store by batch transmission.

\* \* \* \* \*